US008561272B2

(12) United States Patent
Borwig

(10) Patent No.: US 8,561,272 B2
(45) Date of Patent: Oct. 22, 2013

(54) APPARATUS FOR ASSEMBLING INSULATED DUCT SECTIONS

(75) Inventor: Michael C. Borwig, Swisher, IA (US)

(73) Assignee: Formtek, Inc., Westfield, MA (US)

( * ) Notice: Subject to any disclaimer, the term of this patent is extended or adjusted under 35 U.S.C. 154(b) by 701 days.

(21) Appl. No.: 12/719,080

(22) Filed: Mar. 8, 2010

(65) Prior Publication Data
US 2010/0229376 A1 Sep. 16, 2010

Related U.S. Application Data

(60) Provisional application No. 61/159,609, filed on Mar. 12, 2009.

(51) Int. Cl.
B26D 1/10 (2006.01)
B26D 1/34 (2006.01)

(52) U.S. Cl.
USPC ............. 29/34 B; 29/33 Q; 29/33.5; 409/348; 83/356.2; 83/315

(58) Field of Classification Search
USPC ....... 409/308, 312, 348; 29/34 B, 33 Q, 33 S, 29/33.5, 524.1, 525.06; 83/356.2, 315, 83/321, 257, 636
See application file for complete search history.

(56) References Cited

U.S. PATENT DOCUMENTS

| RE5,503 | E | * | 7/1873 | Van Pappelendam | 83/643 |
| 1,009,028 | A | * | 11/1911 | Brown et al. | 83/370 |
| 2,291,650 | A | * | 8/1942 | Robinson | 227/76 |
| 2,746,139 | A | * | 5/1956 | Van Pappelendam | 29/521 |
| 3,173,322 | A | * | 3/1965 | McHenry et al. | 83/175 |
| 3,502,127 | A | | 3/1970 | Nathanson et al. | |
| 3,571,892 | A | | 3/1971 | Levy | |
| 3,780,610 | A | * | 12/1973 | Zadow | 83/643 |
| 3,819,448 | A | * | 6/1974 | Beever, III | 156/355 |
| 4,038,128 | A | * | 7/1977 | Mueller | 156/355 |
| 4,200,020 | A | * | 4/1980 | Durselen | 83/643 |
| 4,401,501 | A | * | 8/1983 | Stumpf | 156/367 |
| 4,470,858 | A | | 9/1984 | McMaster | |
| 4,580,437 | A | * | 4/1986 | Laviano | 72/450 |
| 5,088,370 | A | * | 2/1992 | Kondo | 83/528 |
| 5,647,261 | A | * | 7/1997 | Wierenga | 83/649 |
| 5,774,972 | A | * | 7/1998 | Ehrlich | 29/525.06 |
| 5,895,552 | A | * | 4/1999 | Matsuguchi | 156/354 |
| 6,799,497 | B1 | * | 10/2004 | Creighton et al. | 83/643 |
| 7,802,504 | B1 | * | 9/2010 | Wilkes | 83/74 |
| 8,146,472 | B2 | * | 4/2012 | Nishimura et al. | 83/642 |
| 2005/0279228 | A1 | | 12/2005 | Julian et al. | |

* cited by examiner

Primary Examiner — David Bryant
Assistant Examiner — Jason L Vaughan
(74) Attorney, Agent, or Firm — McCormick, Paulding & Huber LLP

(57) ABSTRACT

A ductmaking apparatus forms a laminate section including a sheet metal layer and a layer of insulation fastened to the sheet metal layer. The layer of insulation is severed from a moving web of insulation by pivoting slicing movement of a knife across the moving web.

10 Claims, 3 Drawing Sheets

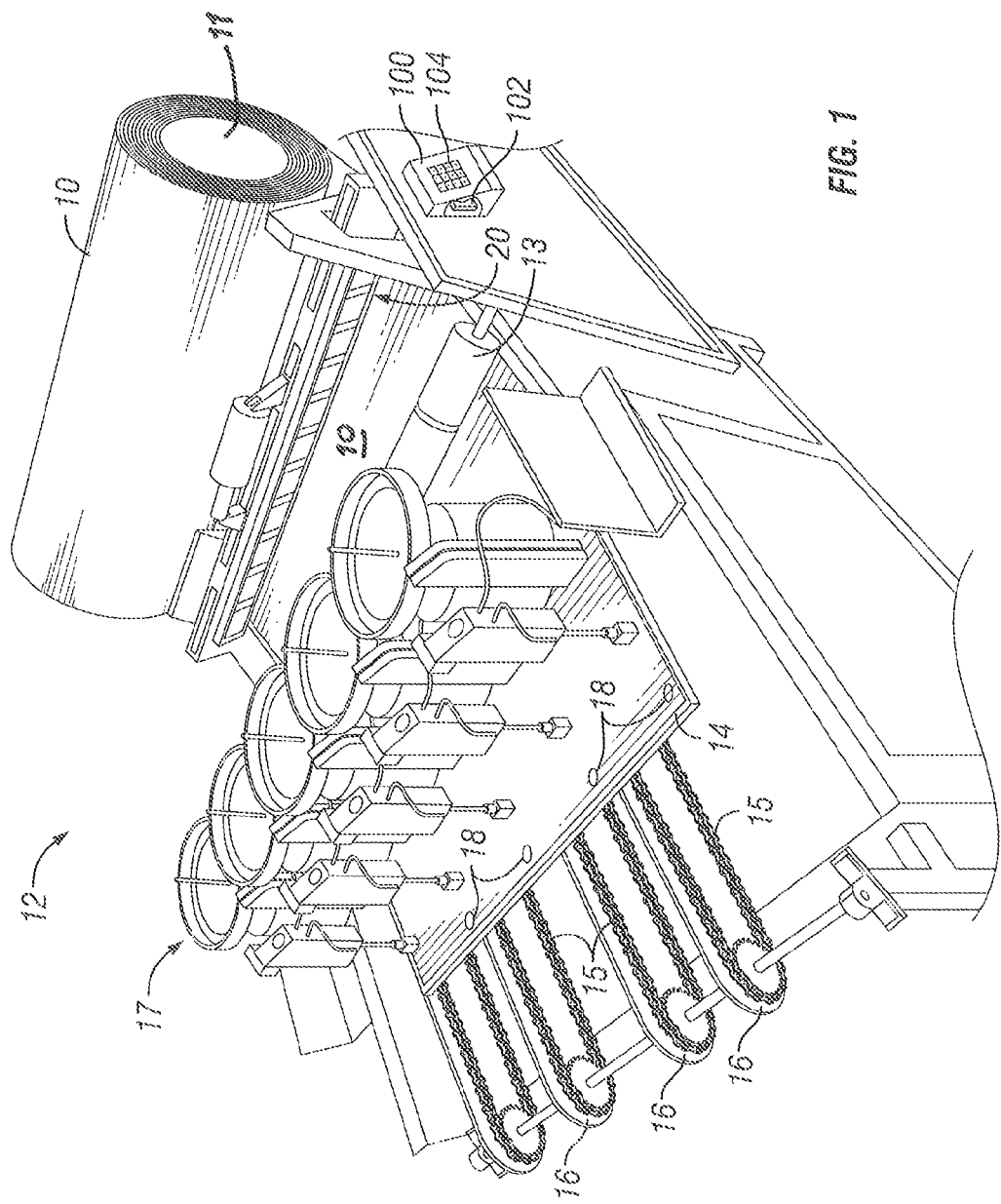

APPARATUS FOR ASSEMBLING INSULATED DUCT SECTIONS

CROSS-REFERENCE OF RELATED APPLICATION

This application claims the benefit of U.S. Provisional Application Ser. No. 61/159,609, filed on Mar. 12, 2009, and herein incorporated by reference in its entirety.

FIELD OF INVENTION

The present invention relates to apparatus for making ventilation ducts and, more particularly, to apparatus for attaching insulation to ventilation ducts.

BACKGROUND OF THE INVENTION

Ducts are extensively utilized in heating and ventilating systems to distribute heated or cooled air throughout a building structure. These ducts are commonly formed from differing gauges of sheet metal, or the like, in sections of predetermined lengths which are then connected to one another to form a continuous duct system for distributing air.

It is oftentimes necessary to integrate insulation material with ductwork in order to provide the required thermal characteristics for a given application. Typically, the insulation that is utilized is comprised of a fiberglass material and is commonly packaged as a continuous roll of insulation. Known cutting devices are then employed to unroll a predetermined amount of insulation and effect a severing action in accordance with the specific type, size and shape of ductwork that is intended to be insulated.

For a variety of reasons, the HVAC industry has often used rubber or neoprene flexible foam insulation in place of or in addition to fiberglass insulation. Unlike fiberglass insulation, foam insulation has significant elasticity and mechanical structure. Because of its elastic structure, the foam insulation has greater mechanical toughness than fiberglass and more strongly resists being cut off by conventional chop or guillotine type shear. Thus, shears presently used for cutting fiberglass insulation and sheet metal can be utilized for cutting foam insulation only by adding structure and power to the shears. However, upgrades to make existing shears sturdier may not be compatible with the machinery in which the shears are housed. Also, stronger shears cost more to build and install, and more powerful shears cost more to operate. It will be readily appreciated that the operational difficulties in obtaining clean, repetitive cuts of the new insulating materials results in reduced productivity and increased labor costs.

With the forgoing problems and concerns in mind, it is the general object of the present invention to provide an insulation cutoff device, which overcomes the above-described drawbacks.

SUMMARY OF THE INVENTION

According to the present invention, a ductmaking apparatus includes a pivoting knife that is used to cut off a segment of fiberglass or foam insulation from a moving web by slicing, rather than by shearing. The ductmaking apparatus fastens the segment of insulation to a metal sheet to form a laminate section.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a perspective view of an apparatus for assembling insulated duct sections, according to an embodiment of the present invention.

DETAILED DESCRIPTION OF THE PREFERRED EMBODIMENT

Figure 2A:
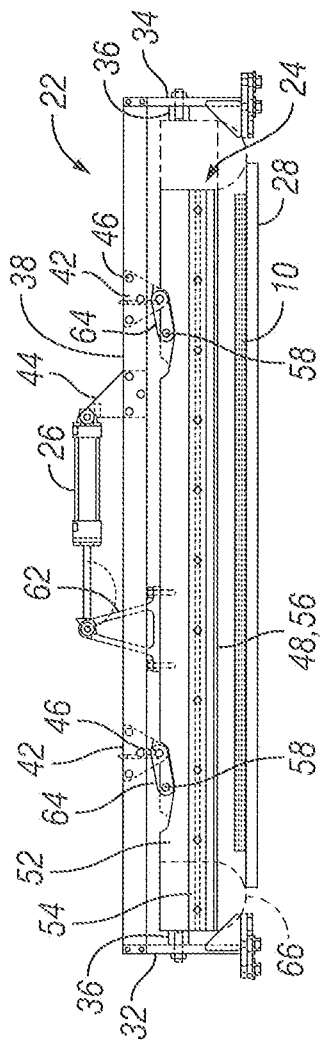
FIGS. 2-5 are side and end elevation views of an insulation cut-off apparatus performing sequential steps of a method using said apparatus, according to an embodiment of the present invention.

Referring to FIG. 1, according to an embodiment of the present invention a sheet of metal is fed from a coil (not shown), and a web of insulation 10 is fed by pinch rollers (not shown) from a roll 11, through an apparatus 12 for assembling insulated duct sections. In the embodiment shown in FIG. 1, the web of insulation is fed above the sheet of metal. The apparatus includes a vertically movable clamp roller 13 for pressing the web of insulation downwardly against the metal sheet to form a laminate section 14, guide rails 15 for supporting the metal sheet/laminate section, and conveyor belts 16 extending along the guide rails for feeding the metal sheet/laminate section under the clamp roller and then under an array of rivet guns 17. The array of rivet guns is movable along tracks extending above and substantially parallel to the guide rails and is operable to fire at least one line of rivets 18 through the laminate section for firmly attaching the web of insulation to the metal sheet. Prior to being clamped together by the clamp roller, the metal sheet is severed from its coil by a hydraulic shear (not shown) and the web of insulation is severed from its roll by an insulation cut off assembly 20. Optionally, a glue gun (not shown) can be included between the clamp roller and the roll of insulation. The glue gun, if included, is operable to deposit adhesive across an upper surface of the metal sheet or a lower surface of the web of insulation, prior to the clamp roller pressing the web of insulation downwardly against the metal sheet. For examples, the glue gun can squirt one or more beads of glue onto the metal sheet, or can spray one or more bands or spots of tack adhesive onto the web of insulation. The entire apparatus can be manually operated, or can be automatically operated by a pre-programmed controller 100.

Figure 2B:
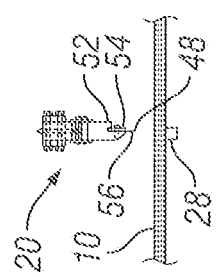
Figure 3A:
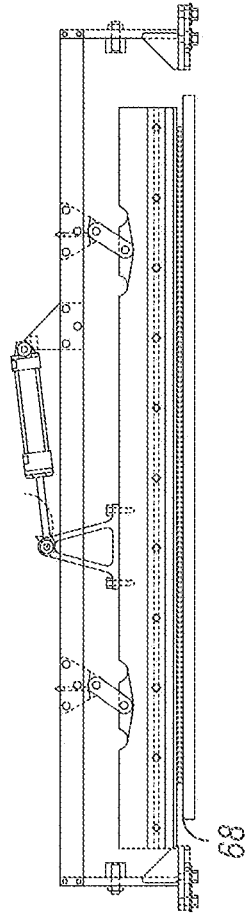
Figure 3B:
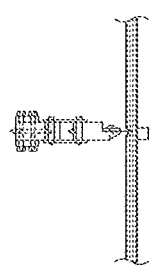
Figure 4A:
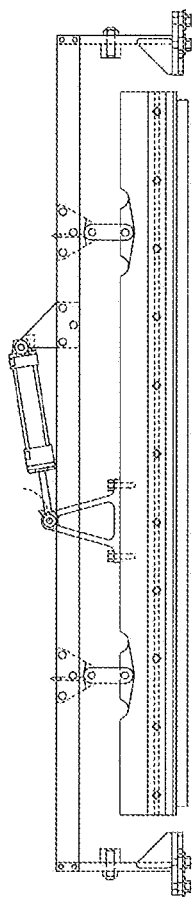
Figure 4B:
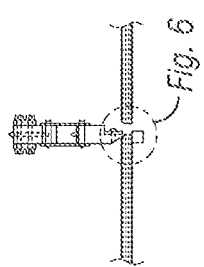
Figure 5A:
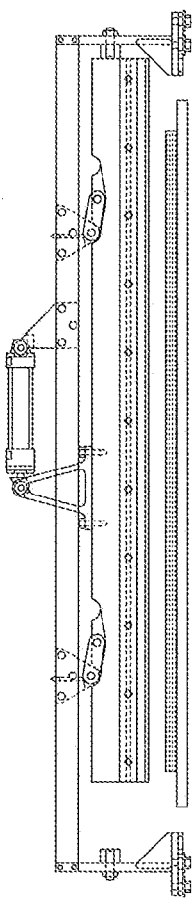
Figure 5B:
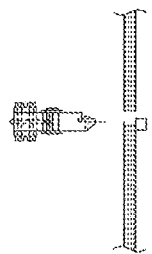
Figure 6:
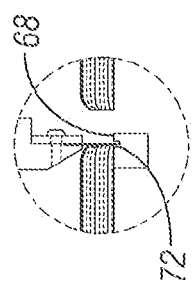
FIG. 6 is a detail side elevation view showing said insulation cut-off apparatus severing a web of insulation.

Referring to FIGS. 2-6, the insulation cut off assembly 20 includes a frame 22, a cut off blade 24 movable within the frame along an arcuate path 66, an air cylinder or other linear actuator 26 connected between the frame and the cut off blade for moving the cut off blade within the frame, and a cutting stick 28 fixedly mounted across a lower side of the frame for supporting the web of insulation within the frame. The cutting stick and the frame together define an opening of the cut off assembly, through which the web of insulation 10 is fed from an upstream side facing the roll 11 to a downstream side facing the clamp roller 13.

The frame 22 includes a left support 32 and a right support 34. Each support has an end bumper 36 fixed to an inner face of the support. The supports are joined at their upper ends by a top crossover bar 38. The top crossover bar includes left and right pivot spacers 42 and an air cylinder mount 44. Each pivot spacer has a link pin 46 protruding therefrom to define a pivot mount point. The pivot spacers define a pivot line that extends substantially parallel to the plane of the frame. However, the pivot line can be somewhat skewed from the plane of the frame if for any reason it becomes desirable to cut the web of insulation at an angle other than perpendicular to its motion through the frame. Optionally, an insulation edge sensor (not shown) can be mounted on the crossover bar between the pivot spacers, and can (for example) be any of a photoswitch, a deflectable finger switch, or a rotary encoder positioned to be rotated by contact with the web of insulation.

The cut off blade 24 includes a knife body 48, a blade holder 52, and a clamp bar 54 securing the knife to the blade holder. Preferably, the knife has a hardened wavey cutting edge 56 for slicing the insulation. The knife also can have a straight edge or a scalloped edge. The blade holder includes two pivot pins 58 and a trunnion mount 62 with the trunnion extending substantially perpendicularly to the body of the knife.

The cut off blade 24 is supported within the frame 22 by pivot links 64 connected between the blade holder pivot pins and the pivot spacer link pins. One (fixed) end of the air cylinder 26 is pivotally connected to the air cylinder mount on the frame, and the other (working) end of the air cylinder is pivotally connected to the trunnion of the blade holder, so that the cut off blade is swingably movable along the curvilinear or arcuate path 66 by extension and retraction of the air cylinder.

The cutting stick 28 extends between bases of the left and right supports. The cutting stick can be any shape, but preferably has a substantially flat upper surface 68 for supporting the moving web of insulation. The upper surface of the cutting stick includes a slot 72 extending the full length of the cutting stick. The slot is disposed in registration with the knife 48. Optionally, the edge sensor previously discussed can be mounted on the cutting stick proximate or within the slot of the cutting stick. Positioning the edge sensor within the slot could be particularly effective for a photosensor, which could then detect the insulation edge based on a change in the light within the slot.

In operation, the air cylinder 26 can be either fully extended or fully retracted to hold the knife 48 away from the cutting stick 28. The sheet or web of insulation 10 is fed through the cut off assembly 20 to a desired length. The air cylinder then is extended or retracted to pivot the cut off blade downward and upward within the frame. As the cut off blade swings downward and upward, the knife moves horizontally across and vertically through the insulation to sever the insulation. At a leftward end of the cut off blade's curvilinear or arcuate path 66, the knife edge 56 is disposed a set distance above the cutting stick 68 and the left end of the blade holder 52 contacts the end bumper 36 of the left support; at a rightward end of the path, the knife edge again is disposed the same distance above the cutting stick and the right end of the blade holder contacts the end bumper of the right support. At the lowest point reached by the cut off blade, approximately midway along the curvilinear path, the knife passes below the upper surface of the cutting stick and into the slot 72 to make a clean cut of the insulation without contacting the cutting stick. Thus, the slot permits the insulation to be cut cleanly to a desired length without binding, partial cuts, or ragged edges and without wearing the knife through contact with the cutting stick.

Additionally, the slot prolongs the useful life of the knife with fiberglass insulation. Fiberglass is very abrasive and will quickly dull the cutting edge 56; however, the dull knife 48 will continue to cut and fracture the fiberglass because of the narrow slot formed in the cutting stick. When switching from fiberglass insulation to conformable foam insulation, a new knife blade is preferred for optimal cutting.

Referring back to FIG. 1, the electronic controller 100 houses a processor 102 pre-programmed to operate the cut off assembly 20, the clamp roller 13, the glue gun, and the rivet guns 17 according to production line speed and desired part length and also houses a keypad, touch screen, USB or other communications port, wireless antenna and signal decoder, or similar means 104 for re-programming the processor. Once programmed, the controller will detect the leading edge of an incoming insulation piece 10 based on an edge-detect signal received from the edge sensor. Alternatively, an operator can pre-feed the web of insulation through the frame and initiate motion of the insulation; at startup of the apparatus, the controller then can direct extension or retraction of the pneumatic actuator to make a first cut. Based on process variables such as (but not limited to) programmed line speed and elapsed time from a previous cut, or elapsed time from detection of the insulation leading edge, the controller can estimate a length of insulation passed through the frame, and can accordingly actuate the glue gun to apply adhesive to the metal sheet, lower and raise the clamp roller to engage and release the web of insulation and the metal sheet, operate the cut off apparatus to cut off the insulation at a desired length, and trigger the rivet guns to pin the insulation to the metal sheet at predetermined locations. For example, line speeds of twenty-five (25) and fifty (50) feet per minute are typical.

Typically, the apparatus is controlled so that the cut-off blade 24 does not sever the web of insulation 10 until the downstream end of the insulation has been clamped against the metal sheet by the clamp roller 13. This mode of operation ensures positive alignment of the insulation to the sheet metal to form a laminate section, in preparation for perforation and fastening of the laminate structure by the array of rivet guns 17.

Although the invention has been shown and described with respect to detailed embodiments thereof, it will be understood by those skilled in the art that various changes in form and detail thereof may be made without departing from the spirit and the scope of the invention. For example, a skilled human operator using mechanical switches and buttons, and responding in real-time to process conditions, can control the apparatus 12. Equally, the apparatus can be controlled by an enhanced electronic controller programmed to respond in real-time to process conditions including (for example) line speed, engagement of the insulation with the clamp roller 13, operation of the glue gun, and stock levels of the glue gun and of each of the array of rivet guns 17.

What is claimed is:

1. An apparatus comprising:
a frame defining an opening for receiving a web of insulation passing into and through the opening from an upstream side to a downstream side of said frame, said frame including at least two pivot mounts disposed along a pivot line extending substantially transverse the motion of said web and including an actuator mount offset from the pivot line;
two or more pivot links with proximal ends pivotally fastened to the pivot mounts of said frame and distal ends pivotally movable about the pivot mounts; an actuator with a fixed end pivotally fastened to the actuator mount of said frame and a working end extensibly and retractably movable toward and away from the actuator mount;
a blade pivotally fastened to the distal ends of said pivot links such that the body and the cutting edge of said blade extend across the opening of said frame substantially transverse to the motion of said web, said blade having an actuator attachment point pivotally connected to the working end of said actuator;

a cutting stick extending across a lower side of the opening of said frame with an upper surface of said cutting stick being substantially perpendicular to the body of said blade, said cutting stick including a slot disposed in registry with the body and the cutting edge of said blade, wherein extension or retraction of said actuator causes said blade to swing in arcuate fashion across the opening of said frame and into and out of the slot formed in said cutting stick, whereby the cutting edge of said blade cleanly severs a web of insulation supported on said cutting stick;

a vertically movable clamp roller extending substantially transverse to the motion of said web and disposed at the downstream side of said frame; and a glue gun disposed between said clamp roller and said frame beneath the path of said web of insulation and above the path of said metal sheet, wherein said glue gun dispenses a bead of glue across said metal sheet before said clamp roller downwardly presses said web of insulation against said metal sheet.

2. The apparatus as claimed in claim 1, further comprising:
a controller operatively connected to said actuator and to said clamp roller, said controller being pre-programmed to extend or retract said actuator to sever web of insulation to a pre-determined length, and to lower said clamp roller for engaging said web of insulation before extension or retraction of said linear actuator to sever said web of insulation.

3. The apparatus as claimed in claim 2, further comprising:
an edge sensor mounted on said frame for detecting an edge of said web of insulation crossing through said frame, and operatively connected to send an edge-detect signal to said controller, wherein said controller is pre-programmed to estimate a length of insulation based on time elapsed from receipt of said edge-detect signal, and to lower said clamp roller and to extend or retract said actuator based on said estimated length of insulation.

4. The apparatus as claimed in claim 1, further comprising:
an array of rivet guns disposed at the downstream side of said clamp roller; and a plurality of conveyor belts having upper surfaces traveling from said clamp roller toward said array of rivet guns, said conveyor belts supporting a metal sheet, wherein said clamp roller presses said web of insulation downwardly against said metal sheet to form a laminate section that moves beneath said array of rivet guns, and said array of rivet guns perforates and fastens together said laminate section with one or more rows of rivets.

5. The apparatus as claimed in claim 4, further comprising:
a controller operatively connected to said actuator, said controller being preprogrammed to extend or retract said actuator to sever said web of insulation to a pre-determined length, to lower said clamp roller for engaging said web of insulation before extension or retraction of said linear actuator to sever said web of insulation, and to actuate said rivet guns according to a pre-determined rivet pattern based on said pre-determined length.

6. The apparatus as claimed in claim 1, further comprising:
a controller operatively connected to said actuator, said controller being preprogrammed to extend or retract said actuator to sever said web of insulation to a pre-determined length, to lower said clamp roller for engaging said web of insulation before extension or retraction of said linear actuator to sever said web of insulation, and to actuate said glue gun based on said pre-determined length.

7. The apparatus as claimed in claim 1, wherein the actuator mount of said frame is offset from the pivot line of said frame along a direction substantially parallel to the plane of the opening of said frame and substantially perpendicular to the pivot line.

8. The apparatus as claimed in claim 1, further comprising:
a controller operatively connected to said actuator, said controller being preprogrammed to extend or retract said actuator to sever said web of insulation to a pre-determined length, and to lower said clamp roller for engaging said web of insulation before extension or retraction of said linear actuator to sever said web of insulation.

9. An apparatus comprising:
a frame defining an opening for receiving a web of insulation passing into and through the opening from an upstream side to a downstream side of said frame, said frame including at least two pivot mounts disposed along a pivot line extending substantially transverse the motion of said web and including an actuator mount offset from the pivot line;

two or more pivot links with proximal ends pivotally fastened to the pivot mounts of said frame and distal ends pivotally movable about the pivot mounts; an actuator with a fixed end pivotally fastened to the actuator mount of said frame and a working end extensibly and retractably movable toward and away from the actuator mount;

a blade pivotally fastened to the distal ends of said pivot links such that the body and the cutting edge of said blade extend across the opening of said frame substantially transverse to the motion of said web, said blade having an actuator attachment point pivotally connected to the working end of said actuator;

a cutting stick extending across a lower side of the opening of said frame with an upper surface of said cutting stick being substantially perpendicular to the body of said blade, said cutting stick including a slot disposed in registry with the body and the cutting edge of said blade, wherein extension or retraction of said actuator causes said blade to swing in arcuate fashion across the opening of said frame and into and out of the slot formed in said cutting stick, whereby the cutting edge of said blade cleanly severs a web of insulation supported on said cutting stick;

a vertically movable clamp roller extending substantially transverse to the motion of said web and disposed at the downstream side of said frame;

an array of rivet guns disposed at the downstream side of said clamp roller; and a plurality of conveyor belts having upper surfaces traveling from said clamp roller toward said array of rivet guns, said conveyor belts supporting a metal sheet; and wherein said clamp roller presses said web of insulation downwardly against said metal sheet to form a laminate section that moves beneath said array of rivet guns, and said array of rivet guns perforates and fastens together said laminate section with one or more rows of rivets.

10. An apparatus comprising:
a frame defining an opening for receiving a web of insulation passing into and through the opening from an upstream side to a downstream side of said frame;

a blade operatively connected to said frame such that a cutting edge of said blade extends across said opening of said frame;

an actuator means for selectively moving said blade in an arcuate fashion across the opening of said frame, whereby said cutting edge of said blade cleanly severs a web of insulation supported for movement through said opening;
a vertically movable clamp roller extending substantially transverse to the motion of said web and disposed at the downstream side of said frame;
an array of rivet guns disposed at the downstream side of said clamp roller; and a plurality of conveyor belts having upper surfaces traveling from said clamp roller toward said array of rivet guns, said conveyor belts supporting a metal sheet; and
wherein said clamp roller presses said web of insulation downwardly against said metal sheet to form a laminate section that moves beneath said array of rivet guns, and said array of rivet guns perforates and fastens together said laminate section with one or more rows of rivets.

* * * * *